Figure 1:
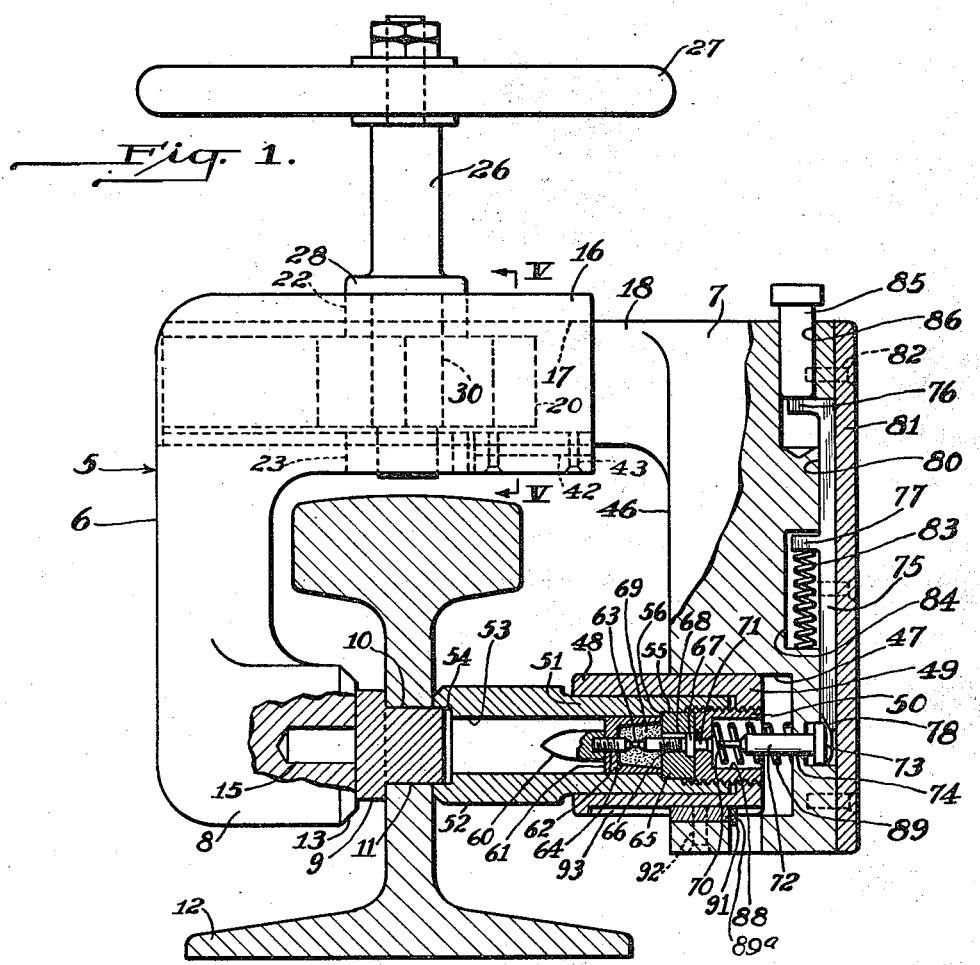

April 6, 1943.   R. TEMPLE, JR   2,316,112
BONDING DEVICE
Original Filed April 28, 1933.   5 Sheets-Sheet 1

WITNESSES
A.B.Wallace.
Feb. Flin.

INVENTOR.
Robert Temple, Jr.
BY Brown, Critchlow & Flinn
his ATTORNEYS

April 6, 1943.  R. TEMPLE, JR  2,316,112
BONDING DEVICE
Original Filed April 28, 1933   5 Sheets-Sheet 2

WITNESSES
A. B. Wallace
J. B. Flick

INVENTOR.
Robert Temple, Jr.
BY Brown, Critchlow & Flick
his ATTORNEYS

April 6, 1943.  R. TEMPLE, JR  2,316,112
BONDING DEVICE
Original Filed April 28, 1933  5 Sheets-Sheet 3
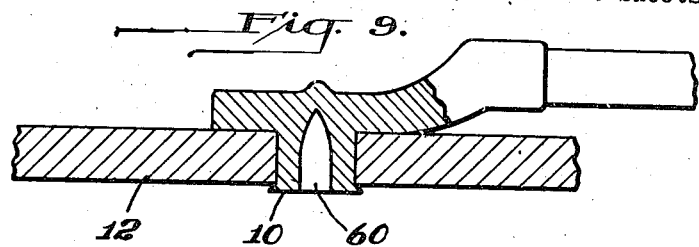
Fig. 9.
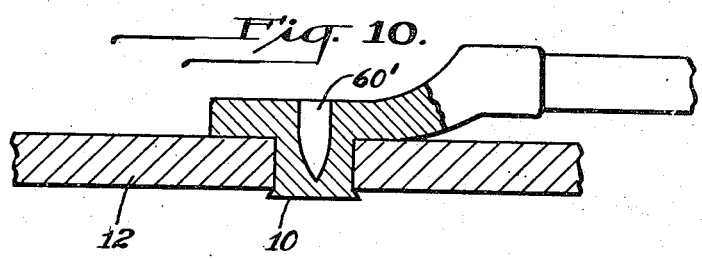
Fig. 10.
Fig. 12.
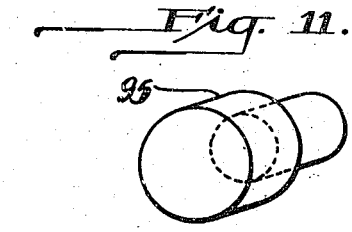
Fig. 11.
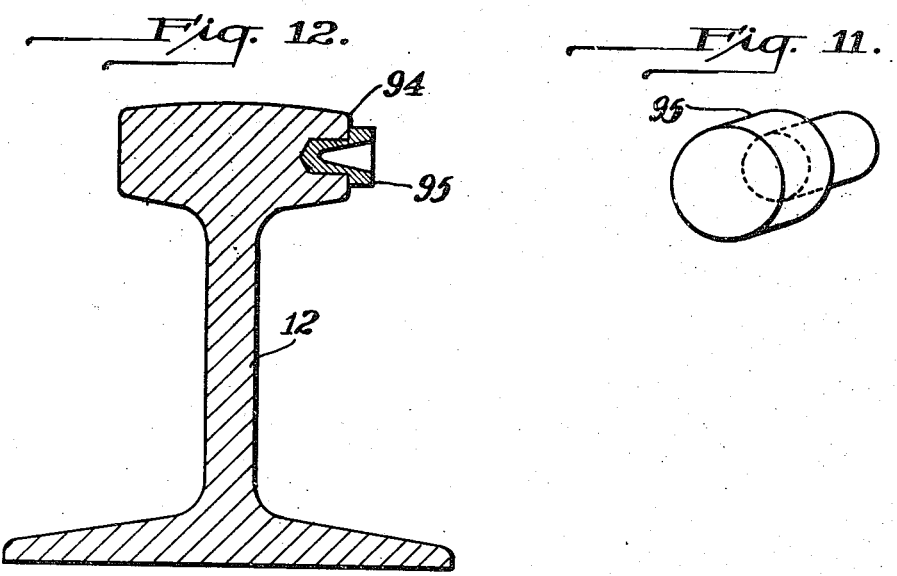
WITNESSES
A.B.Wallace.
J.B.Flick
INVENTOR.
Robert Temple, Jr.
BY Brown, Critchlow & Flick
his ATTORNEYS April 6, 1943.  R. TEMPLE, JR  2,316,112
BONDING DEVICE
Original Filed April 28, 1933   5 Sheets—Sheet 4
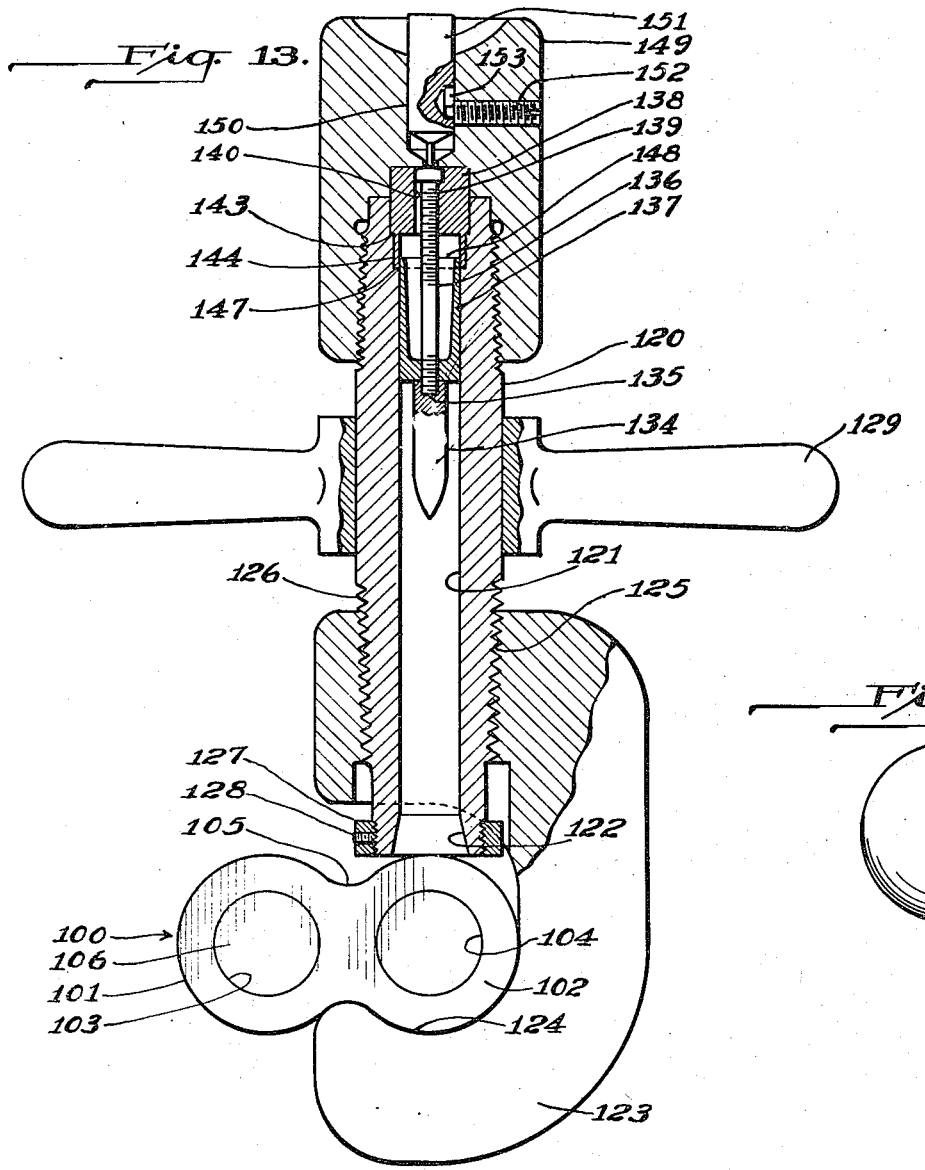
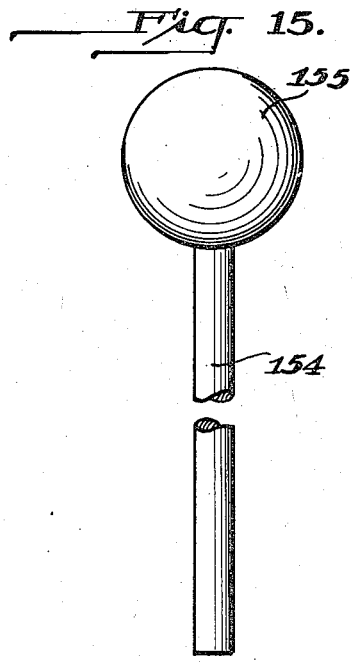
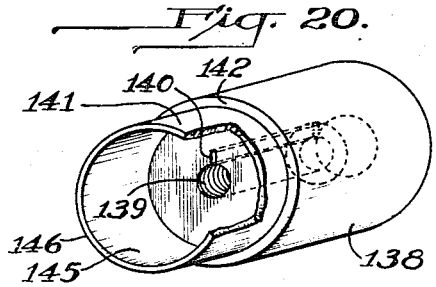

April 6, 1943.   R. TEMPLE, JR   2,316,112
BONDING DEVICE
Original Filed April 28, 1933   5 Sheets-Sheet 5

INVENTOR.
Robert Temple, Jr
BY Brown, Critchlow & Flick
his ATTORNEYS

WITNESSES
A.B.Wallace.

Patented Apr. 6, 1943

2,316,112

UNITED STATES PATENT OFFICE 2,316,112

BONDING DEVICE

Robert Temple, Jr., Pittsburgh, Pa., assignor, by mesne assignments, to Temple Velocity Equipment, Inc., a corporation of Delaware Original application April 28, 1933, Serial No. 668,371, now Patent No. 2,038,913, dated April 28, 1936. Divided and this application March 30, 1936, Serial No. 71,694

17 Claims. (Cl. 1—47)

This invention relates to the forming of bonds by explosively actuated means, and it relates more particularly to the joining together of male and female members, and this application is a division of my U. S. Patent No. 2,038,913, issued April 28, 1936. The invention, which has an especially important use in forming electrical connections, resides generally in driving an element into one or both of the members to be joined under the impulse created by a detonated confined explosive charge.

Considerable difficulty is experienced in securing, at low cost, a perfect connection between two conductors of electricity, whether the conductors to be joined include two wires, or a wire and a surface, or otherwise. Heretofore the best results have been obtained from welding, brazing, or soldering, it being found that mere pressure between the two portions is insufficient to give a good connection.

One of the electrical connection problems which frequently require welding, with its attendant expense and inconvenience, is in securing bonds to rails. In recent years, however, a hydraulic press has been employed at less expense than welding. A hole is drilled in the rail and a copper bond or terminal which carries the connector wire, is inserted in the hole, the bond having a flange or headed portion at one end to prevent it passing completely through the aperture. The press is then employed to compress the bond within the aperture and a fair result is obtained.

One of the objects of the present invention is the provision of an improved tool or means for forcing a projectile-like member into a solid bond to thereby expand it to a point where a substantially perfect connection will be obtained.

In its broader aspect, however, the instant invention contemplates the provision of means for securing male and female members together by driving a projectile into the male and/or the female member under high velocity. The projectile may penetrate only the male member, thereby expanding its sides against the aperture in the female member, or it may penetrate both members, the perfect connection being obtained as a result of the expansion. In any event, the penetrating action causes the members to expand and by so doing affixes them together under great pressure through the lateral expansion of the materials.

Of the two of many embodiments of the apparatus contemplated by the invention which are illustrated in the drawings, one is a tool for penetrating rail and other bonds of the kind above referred to, the tool including a retractable clamping structure which secures the bond in place, and explosively actuated means for driving the projectile into the bond, thereby causing the latter to expand and affix it to the rail or other structure with a perfect contact.

The second embodiment illustrated in the drawings is an apparatus or tool for securing a connector to a main cable in tap-off work. In this instance the connector comprises a structure, made preferably of copper and having two or more longitudinal apertures therein, usually parallel with each other. The main cable is cut where it is to be tapped and the two end portions thereof are inserted into one of the apertures wherein they meet substantially midway. A retractable clamping structure is then secured to the connector and a projectile fired thereinto. Thus, the projectile expands the cable and assures a contact of high conductivity. The tap-off wires may then be inserted into the other aperture and a projectile driven thereinto in the same fashion. In the event that the tap-off wire is of smaller diameter than the aperture a copper bushing may be inserted in the aperture. Likewise, if a number of tap-off wires are desired a second connector is employed, having two or more apertures therein.

Another object of the invention is the provision of an explosively actuated penetrating device for use in connector work, electrical or otherwise, which will develop unusually high velocities, thereby enabling the projectile to penetrate heavy material with ease and with perfect safety.

The invention contemplates also the provision of apparatus for bonding by explosively actuated means wherein no recoil develops as a result of the firing. This is accomplished by confining and sealing the explosive charge in a manner somewhat similar to that shown in United States Letters Patent Nos. 1,365,869 and 1,365,870 granted to my father, Robert Temple.

Still another object of my invention is the provision of means for the securing of a bond terminal to a rail which includes inserting the solid terminal into an aperture in the rail, driving a projectile into the bond wtih such a velocity as to make the expansion great enough to secure a practically perfect contact, explosively actuated means being used for the driving power, the result being accomplished without noise, without recoil, and without a flame, which would be dangerous in underground work.

The invention contemplates further the provision of apparatus of the type disclosed in the aforesaid letters patents by including the provision of a new and improved projectile structure wherein the explosive gases are more thoroughly sealed in the chamber before the initial movement of the projectile takes place. Other objects and advantages of the invention will appear from the following description.

Figure 7:
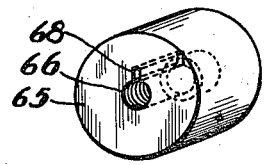
Figure 2:
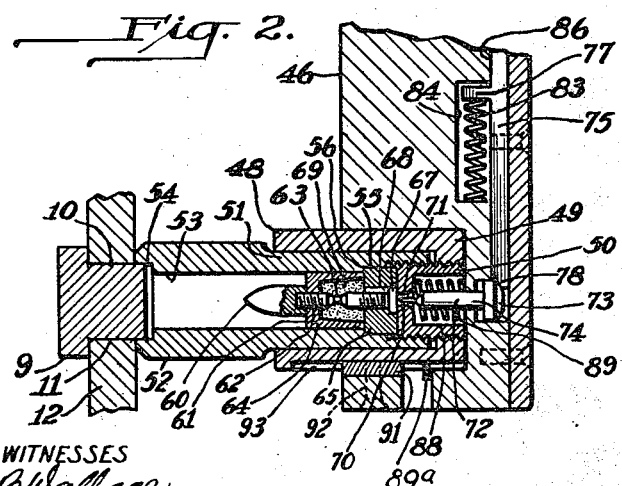
Figure 8:
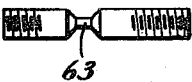
Figure 3:
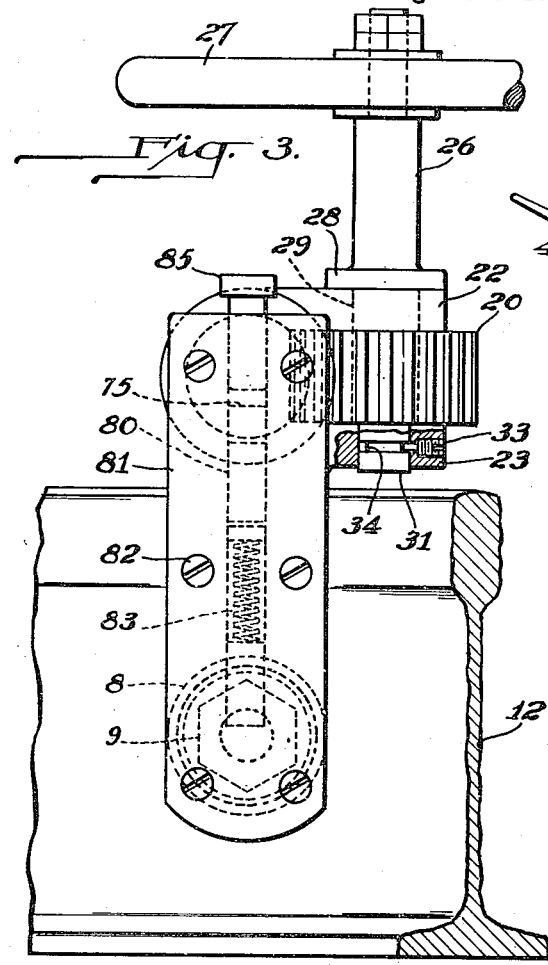
Figure 4:
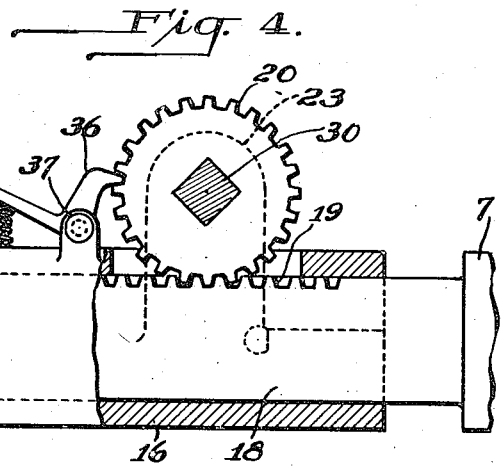
Figure 6:
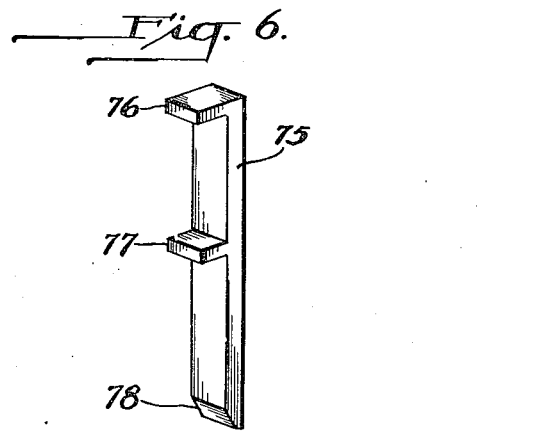
Figure 5:
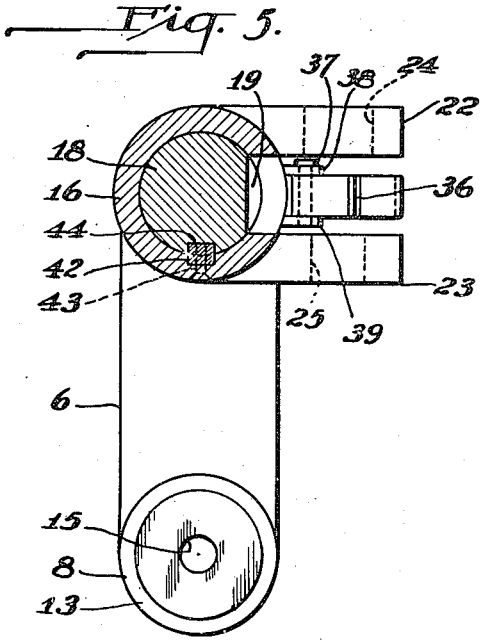
Figure 18:
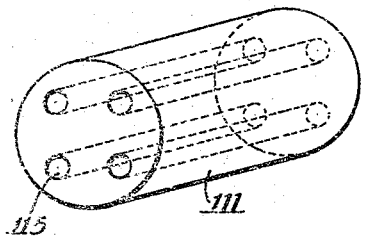
Figure 16:
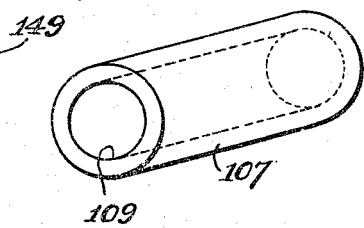
Figure 19:
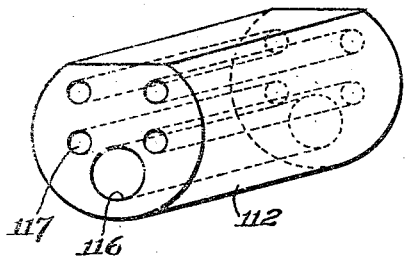
Figure 17:
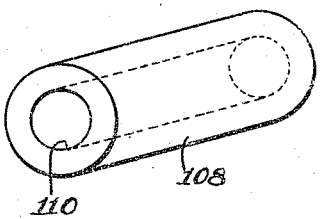
Figure 14:
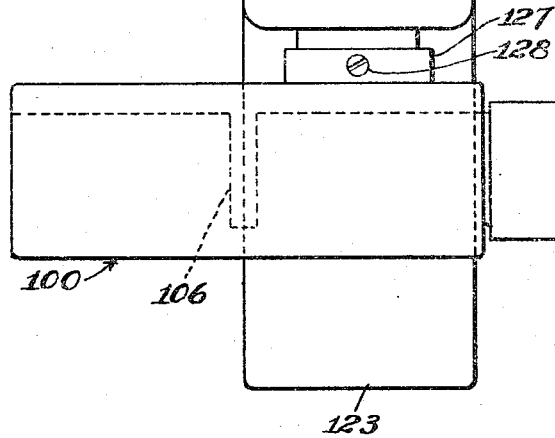

In the drawings Fig. 1 is a front elevation of one embodiment of the invention, partly in section, the clamping structure being shown in the safety, or non-firing, position; Fig. 2 a fragmentary sectional view of the apparatus shown in Fig. 1, the detonating portions being shown in firing position; Fig. 3 an end view of the apparatus; Fig. 4 a fragmentary top plan view, partly in section; Fig. 5 a sectional view taken on line V—V, Fig. 1, the view showing the pinion removed; Fig. 6 a perspective view of the firing pin actuator; Fig. 7 a perspective view of the detonator block; Fig. 8 a side elevational view of the screw which assembles the projectile unit; Fig. 9 a fragmentary horizontal transverse section through a rail and bond secured therein, the view showing the position of the projectile; Fig. 10 a view similar to Fig. 9 showing the position of the projectile when fired from the opposite end of the bond; Fig. 11 a modification in the construction of the bond when used for conducting low amperage currents; Fig. 12 a view similar to Fig. 11 showing the bond in place; Fig. 13 a side elevation, partly in section, of another embodiment of the invention; Fig. 14 a front elevation of the embodiment shown in Fig. 13; Fig. 15 a front elevation of the striking tool for the firing pin of the apparatus shown in Figs. 13 and 14; Figs. 16, 17 and 18 perspective views of reducing bushings used in the apparatus; Fig. 19 a modified connector unit; and Fig. 20 a fragmentary perspective view of the detonator block.

The embodiment of my improved tool illustrated in Figs. 1 to 8, inclusive, comprises a substantially U-shaped, retractable clamping structure or frame 5. This structure includes a downwardly extending L-shaped female member 6 and a downwardly extending male member 7 which carries the explosive means. Female member 6 is shaped to provide an inwardly extending support or portion 8 at its lower end to engage the head portion 9 of a conventional solid copper rail bond or terminal 10 which is placed within a newly drilled aperture 11 in a rail 12. These bonds are of standard construction and are secured at each end of a connector wire, not shown.

The annular edges 13 of the face of portion 8 are preferably bevelled. A centrally disposed aperture 15 extends inwardly from the face. The member 7 and the portion 8 serve to position the material upon which work is to be performed with respect to the barrel carrying the working element, as hereinafter described. They likewise serve to limit the movement of the working element in the direction in which it passes through the barrel while permitting removal of the working element from the end of the barrel. The horizontal portion 16 of female member 6 is provided with a longitudinal aperture 17 therein. Within this aperture the horizontal portion 18 of the male member passes, said portion having a plurality of vertically disposed teeth 19 which function as a rack for engagement by a pinion 20. Pinion 20 is mounted for pivoted movement on the horizontal portion 16 of member 6 in the following manner. A pair of upper and lower lug or pivot supporting portions 22 and 23, respectively, are integral with said horizontal portion 16 which has aligned vertical apertures 24 and 25 therein. A shaft 26 having a circular handle 27 is carried within said aperture, the shaft having a flange portion 28 which engages the upper surface of the upper lug 22. Immediately below the flange is a portion 29 of the shaft which fits within aperture 24 in the lug. Below this portion is a non-circular portion 30 which carries pinion 20, as shown in Fig. 4. The lower end 31 of the shaft is circular and of reduced diameter to fit the reduced aperture 25 in the lower lug. The shaft is secured against removal by means of a set screw 33 in the lug, the end of which engages an annular recess 34 in the shaft.

Thus it will be seen that by revolving the handle in one direction male member 7 moves outwardly to give sufficient clearance at the lower end of the structure to enable it to pass over the head of the rail. By turning the handle in the opposite direction the members move together to the position shown in Fig. 2. When this latter position is reached the pinion is secured against rotation by means of a dog 36 pivotally mounted at 37 in lugs 38 and 39, also integral with the horizontal portion 16, this dog being urged outwardly by means of a spring 40, as shown in Figs. 4 and 5.

Male member 7 is secured against rotation within female member 6 by means of a key 42 secured in a recess in the inner portion of the aperture in the female member, a screw 43 securing the key. The key passes in a longitudinal recess in the male portion 18, as shown in Figs. 4 and 5.

The following explosive means for driving the projectile into the bond are provided. Vertical portion 46 of male member 7 is provided at its lower end with a circular aperture 47 extending inwardly substantially two-thirds of its thickness. Within this aperture a cylindrical sleeve 48 is positioned for longitudinal movement. One end of sleeve 48 is closed and is provided with a threaded aperture 49 in which there is positioned an externally threaded breeching element 50. The breeching element is longer than the thickness of the end portion of sleeve 48, and an elongated cylindrical barrel 51 is carried on the outer end of said breeching element, the inner end of the barrel being threaded to provide for easy removal. The external diameter of the barrel is such as to fit snugly within sleeve 48, the outer end portion being enlarged as shown at 52, this portion having a polygonal external surface for the application of a wrench. An aperture 53 extends from end to end of the barrel, one end portion having an enlarged portion 54 which fits over bond 10, and the opposite end also having an enlarged portion 55 which provides an annular shoulder 56 which supports the projectile and explosive element which will now be described.

The working element or projectile 60 is of a tapered construction, and it is made preferably from tempered steel, or the like. The opposite end of the projectile is provided with a threaded aperture 61 which carries a threaded screw 62. No movement of the projectile can take place until the explosive gases have built up sufficient pressure to break this screw, and to facilitate breaking the screw is provided with an annular recess 63. Adjoining the rear end of the projectile is a working element or cup 64 closely fitting the base of the barrel, the cup having a central threaded aperture through which screw 62 passes, thereby securing the cup, the projectile, and the screw together. A cylindrical detonator block 65, having a threaded aperture 66, is carried at the opposite end of the screw and is of an enlarged diameter to fit closely enlarged portion 55 of the aperture in the barrel, and it rests against a shoulder 56. A detonator cap 67 is positioned in a recess in the block, the block having also a longitudinal slope 68 through which the flash from the cap may travel into the chamber provided by the cup, the chamber being filled with a suitable charge 69 of powder.

Thus, when detonation takes place the initial movement of the working elements, namely projectile 60 and cup 64 is retarded until sufficient pressure is built up to break screw 62. When this occurs the projectile moves forward and into the bond, the cup being stopped when it strikes the end of the bond. By virtue of the fact that the cup closely fits the bore of the barrel, the explosive gases are not released immediately after the explosion, this fact being responsible for the lack of any recoil in the apparatus and likewise serving to prevent the working element or elements from escaping from the barrel.

The cup 64 striking the end of the bond not only serves to compact the bond and perform work thereon but also serves to stop the projectile substantially flush with the surface of the bond as shown in Figs. 9 and 10 of the drawings.

The following means are used to actuate the firing pin 70, the pin being adapted to pass through an aperture 71 in the breeching element. Pin 70 is integral with firing rod 72 having a curved head portion 73, and it is mounted in an aperture 74. The firing rod is caused to move forward by means of a firing pin actuator 75 shown in detail in Fig. 6. The actuator includes an offset portion 76 at its upper end, a spring engaging offset portion 77 substantially midway, and a diagonal portion 78 at the lower end which engages head 73 of the firing rod 72. The actuator is mounted for longitudinal movement within a slot 80 in the outer surface of vertical portion 46 of the male member, and is secured against removal by means of a plate 81 held thereon by screws 82. The actuator is urged upwardly by means of a spring 83 positioned within a recess 84 in slot 80, the upper end of the spring engaging offset portion 77. The actuator is moved downwardly by means of a removable pin 85 mounted in an aperture 86 in vertical portion 46 of male member 7, the pin engaging offset portion 76 of the actuator.

To prevent accidental discharge of the apparatus the following safety means are provided. An aperture 88 in breeching element 50 receives a coil spring 89 the opposite end of which engages the rear wall of aperture 47 at the lower end of the male member. This spring normally urges breeching element 50 and the sleeve outwardly, as seen from Fig. 1, the outward movement thereof being limited by means of a removable set screw 89a. Rotation of the bushing is prevented by means of a key 91 secured at the lower side of aperture 47 by a screw 92, the key extending into a slot 93 in the bushing.

When in this outward position, as shown in Fig. 1, firing pin 70 does not lie adjacent detonating cap 67, thereby preventing accidental discharge. When, however, handle 27 is revolved further, thereby drawing male member 7 inwardly to the position indicated in Fig. 2, the firing pin is adjacent the cap and when the firing rod actuator is moved downwardly by pin 85 the charge is set off and the projectile driven into the bond.

Fig. 9 shows the position of projectile 60 after it has penetrated bond 10. The support of the bond during the penetration prevents any appreciable amount of the copper from passing out, as shown.

In Fig. 10 projectile 60 is shown as being secured through the head of the bond, which is almost as satisfactory except that some of the copper escapes unless it is very firmly supported at both ends.

Fig. 11 shows a modified form of bond for use in low amperage work wherein a much smaller bond may be used than in high amperage work. This bond is particularly adapted for signal connectors which are secured to the rails. In this instance an aperture 94 is drilled somewhat less than one-half an inch into the head of rail 12, and bond 95 is inserted therein. The projectile, not shown, is tapered to a greater angle so that after it is fired it may be removed readily, thus leaving the bond secured with the aperture as shown in Fig. 12.

Another embodiment of the invention, shown in Figs. 13 to 20, inclusive, is an explosively actuated penetrating tool similar to the embodiment just described. The embodiment of Figs. 13 to 20 is adapted, however, for use in cases wherein one connector is a male member which is passed into a sleeve or female member, in which case it is desirable to fire a projectile into the combined or assembled members from the side rather than from the end, with the male member only, as in the preferred embodiment. In this second type of work the desired expansion is obtained and a substantially perfect electrical connection results.

In a previous United States Patent No. 2,030,803, issued February 11, 1936, I described a press capable of developing tremendous pressure for cable splicing work. In this instance the two ends of the cable to be connected are placed in opposite ends of a copper sleeve which is compressed in a plurality of places under twenty to thirty tons pressure.

The embodiment of the invention shown in Figs. 13 to 20 is intended largely for tap-off work rather than cable splicing. It contemplates the use of a copper connector 100 of the type illustrated in Figs. 13 and 14, the connector being preferably cast or pressed and including two or more integral cylindrical portions 101 and 102 having longitudinal apertures 103 and 104 parallel with each other. For convenience in supporting the connector during the penetrating operation, a concave depressed portion 105 is provided on each side. Also to aid in placing the ends of the cable within the apertures the proper distance the central wall 106 is provided in each aperture.

When a main cable, which is usually of the size of the apertures 103 and 104, is to be tapped, the cable is cut in the proper position and the ends inserted within one of the apertures and a projectile driven thereinto as hereinafter described. The driving of the projectile causes the cable to expand laterally against the walls of the aperture and give a perfect contact. The other aperture may then be employed to receive the auxiliary tap-off wire. In the event that the latter is smaller than the aperture, reducing bushings 107 and 108 having apertures 109 and 110 of varying sizes may be inserted in the larger aperture and the projectile driven thereinto in the same fashion.

Also, in case a number of tap-off wires are required connectors 111 of the type illustrated in Fig. 18 may be employed, said bushing having four longitudinal apertures 115 of the same size.

Fig. 19 shows a separate connector unit 112 having a large aperture 115 and four smaller apertures 117, the connector being adapted to be inserted within the apparatus as hereinafter described.

The driving device in this instance includes an elongated barrel 120 having an aperture 121 extending therethrough. The lower end of the aperture is slightly tapered as shown at 122 to aid in the removal of the cup portion of the projectile, hereinafter described, after the detonation. Connector 100 rests in a C-shaped support or supporting element 123 having a concave lower portion 124 to receive the connector, and a threaded aperture 125 at its upper end to receive threaded portion 126 of the barrel. The element 123 serves to position the material upon which work is to be performed with respect to the barrel 120 carrying the working element and likewise serves to limit the movement of the working element in the direction in which it passes through the barrel while permitting removal of the working element from the end of the barrel. A threaded bushing 127 at the lower end of the barrel is secured against rotation by a set screw 128, the bushing preventing removal of the connector-supporting element. When it is desired to insert the connector the barrel is revolved by turning a handle 129 keyed to the barrel, and after the connector is in place the handle is revolved in the opposite direction until the lower end of the barrel engages the connector firmly, as shown in Figs. 13 and 14.

Fig. 13 shows a feature of the present invention according to which the projectile unit affords more effective sealing of the explosive gases in their chamber before the initial movement of the cup and the projectile takes place.

The projectile unit includes a working element in the form of a tapered projectile 134 having a threaded aperture 135 at its rear end which receives a threaded screw 136 that also supports a working element comprising a tapered cup 137. The opposite end of the screw is secured in detonator block 138 in a manner similar to that described in connection with the preceding embodiment, the block having a threaded aperture 139 to receive the screw, and a slot 140 to conduct the flash. Thus, the projectile unit is assembled into one piece which separates with sufficient pressure built up to break the screw.

The detonator block in this instance is formed with a reduced portion 141, the shoulder 142 formed thereby engaging the shoulder 143 formed by an enlarged portion 144 at the upper end of the aperture 121 in the barrel.

The reduced portion 141 is hollow forming a circular chamber indicated at 145, the lower edge 146 thereof engaging a shoulder 147 in the barrel, thus giving the detonator block two points of support. The upper edge 148 of the cup 137, when assembled, as shown in Fig. 13, extends into the chamber 145, closely fitting therein to prevent the escape of gases, until sufficient pressure is built up to break the screw.

The detonator block is held in place by means of a screw cap or frame 149 having a central aperture 150 to receive the firing pin 151. The firing pin is secured against removal by a set screw 152 which engages a slot 153 in the firing pin.

In this type of tool it is desired to provide separate and unattached means for striking the firing pin which in this instance is a hammer 154 having a ball head 155.

The method described herein is claimed in my U. S. Patent No. 2,038,913, issued April 28, 1936, of which the present application is a division.

According to the provisions of the patent statutes, I have explained the construction and mode of operation of my invention, and have described what I now consider to represent its best embodiment. However, I desire to have it understood that, within the scope of the appended claims, the invention may be practiced otherwise than as specifically described and shown.

I claim:

1. A portable splicing tool comprising a support for the cable splicing elements, a barrel, means for shooting a projectile through said barrel and against the cable splicing elements on said support, the support being spaced from the end of the barrel a sufficient distance to permit removal of the projectile from the end of the barrel.

2. A portable tool adapted for splicing cables comprising a member having a barrel, an explosion chamber communicating with said barrel, a working element freely movable through and out of said barrel, means for exploding a charge of material in said chamber to actuate said working element, a support for cable splicing elements, and means for positioning said elements on said support and in front of the end of said barrel whereby the working element is projected under the impulse of the explosion through said barrel and against the cable splicing elements.

3. The method of performing work upon metal or other material which comprises positioning a working element in an explosion chamber, placing the material to be operated upon in spaced relation to said working element, exploding a charge of material in said chamber, utilizing the force of the explosion to project said working element from the explosion chamber, through a barrel and against said material and removing said working element from said barrel and from engagement with said material after the force of the explosion has been dissipated.

4. The method of performing work on metal or other material which comprises placing the work on a support and firing a projectile against the work through a barrel positioned sufficiently close to the work to prevent the projectile from escaping from the barrel and thereafter removing the projectile from the barrel.

5. A portable cable splicing tool comprising a rigid support for the cable splicing elements carried by the tool, a barrel, an explosion chamber communicating with said barrel, and means for shooting a free projectile through said barrel and against the cable splicing elements on said support under the action of an explosive charge in said chamber into a position in which it may be removed from the barrel after the force of the explosion has been dissipated.

6. The method of securing members together which comprises placing said members in overlapping relation on a rigid support, positioning a working element in an explosion chamber and in spaced relation to said members, exploding a charge of material in said chamber, utilizing the force of the explosion to project the working element from said chamber, through a barrel and against that portion of one of said members which overlaps another and removing the working element from said barrel after the force of the explosion has been dissipated.

7. The method of splicing cables which comprises inserting the ends of the cable to be spliced into a sleeve, positioning the sleeve with the ends therein on a rigid support, placing a working element in an explosion chamber in spaced relation to said sleeve, exploding a charge of material in said chamber, utilizing the force of the explosion to project the working element from said chamber, through a barrel and against said sleeve and removing the working element from the barrel after the force of the explosion has been dissipated.

8. The method of securing a terminal member to a cable which comprises placing said terminal member in overlapping relation with a cable to which it is to be secured and upon a rigid support, placing a working element in an explosion chamber and in spaced relation to said terminal member, exploding a charge of material in said chamber, utilizing the force of the explosion to project the working element from said chamber, through a barrel and against that portion of the terminal member overlying the cable and removing the working element from said barrel after the force of said explosion has been dissipated.

9. A portable cable splicing tool having a barrel, a working element movable within said barrel under the action of an explosive charge, and a support for the cable splicing elements positioned in front of said barrel and spaced therefrom a sufficient distance to permit removal of the working element from the end of the barrel after completion of the working operation, said support being connected to the barrel by means presenting an open-sided recess for the insertion of the cable splicing elements between the end of the barrel and the support.

10. Apparatus for making a mechanically and electrically sound connection between a solid male electrical conductor and a female electrical conductor comprising in combination a C-frame, means for rapidly moving one of the arms of the C-frame toward the other arm to clamp the male conductor in the female conductor, means for locking the C-frame in its clamping position, a projectile-receiving barrel mounted in one arm of the C-frame in the line of the axis of the male member, and means associated with said barrel for detonating an explosive charge in said barrel to move a projectile through the barrel and cause it to pierce the male member and make the connection between said members.

11. Apparatus for performing work on metallic or like members comprising in combination a C-frame, means for moving one of the arms of said C-frame toward the other arm to clamp said members together, a barrel slidably mounted in one arm of the C-frame for movement to and from contact with at least one of said members and provided with a bore for receiving a projectile movable therethrough and an explosive charge to drive the projectile, means yieldably urging said barrel away from its supporting arm, and detonating means associated with said barrel for exploding said charge to propel the projectile through the barrel and cause it to engage at least one of said members.

12. Apparatus for securing metallic or like members together comprising in combination a barrel provided with a bore for receiving a projectile movable therethrough and an explosive charge to drive the projectile, a frame mounting the barrel and providing a support for said members in line with the axis of the barrel but spaced from the end thereof to allow introduction of said members between the end of the barrel and said support, means for adjusting the barrel and frame relative to each other to act on at least one of said members to clamp said members between the barrel and frame, means associated with the barrel for detonating said explosive charge to drive said projectile through the barrel and cause it to pierce said members so that its outer end will be substantially flush with the outer surface of the connected members.

13. In combination, a support member, an aperture in the support member, a barrel provided with a bore and slidably mounted in the aperture and projecting from said member, spring held means to engage and to resist movement of the barrel in one direction, manually operated means associated with the support member to effect pressure by the barrel against said spring held means when the device is mounted for operation to overcome the resistance of the spring held means, and firing means mounted on said support member to detonate an explosive charge positioned in the said bore after the said spring held resistance has been overcome.

14. A bonding device for applying bonds to rails comprising an elongated body member having an aperture at one end transversely disposed to the longitudinal axis of the member, a barrel slidably mounted in the aperture, a bore through the barrel to receive a projectile and an explosive charge to drive the projectile, means associated with the body member and cooperating with the same to secure the barrel in operative position relative to the rail and bond, means to yieldingly resist movement of the barrel in one direction, and manually operable firing means for exploding said charge after the resistance of said yielding means has been overcome and the barrel and charge therein moved within range of the firing means.

15. Apparatus for securing metallic or like members together comprising in combination a barrel provided with a bore adapted to receive a projectile provided with means for limiting the piercing movement so that the outer end of the projectile will be substantially flush with the outer surface of the connected members, and adapted also to receive an explosive charge, means for mechanically clamping the end of said barrel against one of said members, and means for detonating said charge.

16. In a device for securing electrical contact between male and female connectors, a barrel adapted to receive a projectile provided at its rear end with a screw, and adapted also to receive an explosive charge for driving the projectile through the barrel, a retractable element associated with said barrel for receiving and supporting said connectors, a detonator block associated with said barrel and provided with a recess adapted to receive the rear end of said projectile and provided at its forward end with a threaded aperture adapted to receive said screw, a cap associated with the outer end of said block, and means for detonating said explosive charge.

17. In a device for performing work on metallic or like members, a barrel having a bore adapted to receive a projectile provided at its rear end with a screw and adapted also to receive an explosive charge for driving the projectile through the barrel, a retractable element associated with said barrel for supporting said members, a detonator block associated with said barrel provided at its inner end with a threaded aperture adapted to receive said screw, and a cap for the outer end of said block, and means associated with said block for detonating said charge.

ROBERT TEMPLE, Jr.